(12) United States Patent
Canuto

(10) Patent No.: US 9,308,610 B2
(45) Date of Patent: Apr. 12, 2016

(54) MODULAR STRUCTURE FOR SUPPORTING BLANKS

(75) Inventor: Almerino Canuto, Casale sul Sile (IT)

(73) Assignee: FCS SYSTEM SRL (IT)

( * ) Notice: Subject to any disclaimer, the term of this patent is extended or adjusted under 35 U.S.C. 154(b) by 260 days.

(21) Appl. No.: 13/823,919

(22) PCT Filed: Sep. 30, 2010

(86) PCT No.: PCT/IT2010/000412
§ 371 (c)(1),
(2), (4) Date: Mar. 15, 2013

(87) PCT Pub. No.: WO2012/042546
PCT Pub. Date: Apr. 5, 2012

(65) Prior Publication Data
US 2013/0175751 A1    Jul. 11, 2013

(51) Int. Cl.
*B23Q 3/00*    (2006.01)
*B23Q 3/10*    (2006.01)

(52) U.S. Cl.
CPC ............. *B23Q 3/105* (2013.01); *B23Q 3/103* (2013.01)

(58) Field of Classification Search
USPC ....................................................... 269/311
See application file for complete search history.

(56) References Cited

U.S. PATENT DOCUMENTS

| | | | |
|---|---|---|---|
| 3,944,203 A * | 3/1976 | Brekelbaum | 269/296 |
| 3,967,816 A * | 7/1976 | Ramsperger et al. | 269/9 |
| 5,305,992 A * | 4/1994 | Kish | 269/51 |
| 6,244,780 B1 | 6/2001 | Hansson | |
| 6,279,888 B1 * | 8/2001 | Wal, III | 269/37 |
| 6,527,266 B1 * | 3/2003 | Yonezawa et al. | 269/309 |
| 6,619,646 B2 * | 9/2003 | Yonezawa | 269/309 |
| 6,702,272 B2 * | 3/2004 | Monvavage | 269/266 |
| 6,890,248 B2 * | 5/2005 | Whitmarsh et al. | 451/365 |
| 6,905,117 B2 * | 6/2005 | Bernhard et al. | 269/309 |
| 7,021,615 B2 * | 4/2006 | Kuroda | 269/309 |
| 7,036,810 B2 * | 5/2006 | Wal, III | 269/296 |

(Continued)

FOREIGN PATENT DOCUMENTS

| CN | 2068135 U | 12/1990 |
|---|---|---|
| CN | 1122741 A | 5/1996 |

(Continued)

OTHER PUBLICATIONS

International Search Report for corresponding application No. PCT/IT2010/000412 filed Sep. 30, 2010; Mail date May 31, 2011.
Chinese Office Action issued Jan. 7, 2015 re: Chinese Application No. 2010800693471.

*Primary Examiner* — Lee D Wilson
*Assistant Examiner* — Alvin Grant
(74) *Attorney, Agent, or Firm* — Cantor Colburn LLP

(57) ABSTRACT

A modular structure, particularly for supporting blanks, which comprises at least one flat plate which has a plurality of seats which can be integrally and removably associated with at least one portion of a blank to be worked on by way of fixing elements, which comprise a fixing element that has at least one lower portion which can be faced towards the plate and which is provided with at least one pin which can be engaged, respectively, with a seat of the plate, and can be inserted along its axis in a cavity defined by a lower portion through a hole with a substantially elongated shape along a predefined direction and is substantially perpendicular with respect to the axis of the pin.

15 Claims, 5 Drawing Sheets

(56) References Cited

U.S. PATENT DOCUMENTS

| | | | |
|---|---|---|---|
| 7,044,462 B2 * | 5/2006 | Iwata | 269/309 |
| 7,264,416 B2 * | 9/2007 | Kahl | 403/187 |
| 7,520,495 B2 * | 4/2009 | Stark | 269/309 |
| 7,819,392 B2 * | 10/2010 | Kuroda et al. | 269/309 |
| 8,177,210 B2 * | 5/2012 | Kitamura et al. | 269/309 |
| 8,292,282 B2 * | 10/2012 | Gao et al. | 269/311 |
| 8,403,314 B2 * | 3/2013 | Chung et al. | 269/283 |
| 8,505,896 B2 * | 8/2013 | Kitaura et al. | 269/309 |

FOREIGN PATENT DOCUMENTS

| | | |
|---|---|---|
| CN | 1411952 A | 4/2003 |
| CN | 101502935 A | 8/2009 |
| DE | 9012822 U1 | 11/1990 |
| EP | 1346794 A1 | 9/2003 |
| JP | 3178978 B2 | 5/1996 |

* cited by examiner

MODULAR STRUCTURE FOR SUPPORTING BLANKS

TECHNICAL FIELD

The present invention relates to a modular structure, particularly for supporting blanks.

BACKGROUND ART

Nowadays the execution of determined operations, such as for example painting, cleaning and assembly, or the execution of various different forms of processing, such as for example those for the removal of shavings, require the piece and/or blank to be locked in a specific position for the processing thereof.

In the field of processing for the removal of shavings, the use is undoubtedly known of machine tools such as, for example, lathes, milling machines, drills and grinding machines.

These machines are usually used in environments which are distinguished by production runs of many and varied products or blanks in small batches.

In many situations the use of such machine tools is essential in workshops which produce individual pieces, made to order.

It follows from this that there is the necessity to organise a production system that is particularly versatile, i.e. which can be adapted to the manufacture of several and heterogeneous products, made usually as unique pieces, or in an extremely limited run, in the majority of cases.

This type of system, commonly called Job-Shop, practically represents the stereotype of the production method which is the exact opposite of that which characterises mass production.

Mass production consists in the manufacture of a small quantity of different types of product, each of which is however reproduced on a large scale in huge quantities, which can vary between the thousands or even millions of batches.

While in mass production it is normal to automate the production process by means of a suitable layout of dedicated machines which are mutually connected in sequence, the same can not be said for production to order.

In production to order, the necessity to make use of a production system that is flexible, i.e. a system which can potentially be adapted to the implementation of several types of production, precludes the possibility of entirely automating the production by means of organising the system that is adapted to obtain a single type of product.

In production to order, the lack of an absolute automation thus confers importance upon manual interventions.

In particular, it is appropriate to note that the positioning and associated fixing of the piece to be worked on onto the machine tool are carried out manually.

Vice versa, in mass production, these same preliminary operations are carried out automatically by robots or mechanical anthropomorphic arms with varying degrees of freedom.

In using the machine tools normally adopted in a Job-Shop system, the use is widely known of vices, or some form of manual devices adapted to permit the positioning and subsequent locking in place of the piece to be worked on with the machine tool.

The use of such locking devices of known type is in any case also widespread in working environments which are entirely different from the above mentioned environment, for example in order to be able to carry out painting or cleaning operations, or the assembly of two or more bodies.

More generally, such devices of the known type are indispensable whenever the stable locking in place is required of an object to be worked on, by means of generic operations which are also simple, not necessarily concerning a purely industrial environment.

The devices of known type are usually constituted by a pair of vertical spacer elements, the height of which and the relative distance of which can be varied as a function of the dimensions and of the shape of the piece to be locked in place.

Such spacer elements have, in an upper region, means of interconnection for a pair of substantially horizontal supports or arms, arranged in mirror-symmetry with respect to each other and brought into engagement with the piece to be locked in place at the lower surfaces thereof.

Each support has, substantially centrally, a hole that is adapted to permit the passage of a vertical rod, which is substantially parallel to the corresponding spacer element, and is coupled underneath to the work bench of the machine tool.

Such rod has in an upper region a threaded end which protrudes from the support, so as to permit the removable interconnection of means adapted to the temporary fixing of such rod, such as, for example, counter-threaded nuts.

The piece to be worked on, which usually has a substantially squared shape, can then be preliminarily interposed between the pair of supports arranged mirror-symmetrically with respect to each other.

Subsequently the adjustment of the supports is carried out, both of their height and of their relative distance, as a function of the dimensions of the piece interposed between them.

The operation to lock the piece in place is then performed by means of the contact under pressure expressed between an end portion of the lower surface of the supports and two opposite ends of the upper surface of such piece.

A significant drawback, found in devices of the known type, lies precisely in the fact that in order to achieve a stable locking in place of the piece it is necessary to bring both of the spacer elements of the locking device into contact with two opposite lateral faces of such piece.

This precludes the possibility of working on these lateral faces, which, since they are affected by such approaching, do not have surfaces which are free so as to permit contact with the tool or, more generally, with the component of any machine tool.

Following from this is the necessity of having to subsequently remove the piece and positioning it according to a new orientation such as to permit the exposure of the two lateral surfaces which before were partially concealed by the locking elements.

A further aggravating circumstance of the above mentioned problem consists in the fact that, when the piece is locked in place, it has at least three surfaces upon which no work can be performed, the third surface, in addition to the lateral surfaces adjacent to the locking elements, being the lower surface, which is resting entirely on the workbench of the machine tool.

Following from this is the necessity of having to resort to multiple subsequent positioning operations and associated locking operations of the piece, with the further aggravating circumstance of repeatedly make systematic errors of positioning, which will thus have negative repercussions for the overall precision that can be achieved at the end of working on the piece.

Another drawback noted in such devices of the known type lies in the necessity of availing of qualified labour in order to be able to carry out the delicate preliminary operations of positioning and centering the piece.

A further drawback, which often occurs in such locking devices of the known type, consists in the possible damaging of the piece owing to localised deformation, at the surfaces which have already been worked on and are subsequently subjected to contact with the supports, in order to permit the operator to work on any surfaces of the piece that have not yet been worked on.

A significant problem, in addition to the problems already cited, refers to the considerable expenditure of time caused by repeated successive releasing, repositioning and re-locking operations on the piece which is destined for any form of processing on more than one surface.

In order to overcome the above mentioned drawbacks, a fixing system has been developed which can be interposed between the blank to be worked on and a work plate fixed to the reference system of the machine with which to carry out the work, which substantially comprises a plurality of fixing elements which are constituted by two opposing portions each provided with jaws which are adapted to engage, respectively, with two threaded pins which can be screwed in respective threaded holes which are formed both on the work plate and on the blank.

Moreover, a variation of the above mentioned system is known which consists in the fact that it comprises a device for gripping the blank in place of the threaded pin which can be associated with the blank and, more precisely, in the hole in which one of the threaded pins would be screwed.

Such other fixing systems of known types are not free from drawbacks, including the fact that, since the work plate has a pitch of the threaded seats that is almost constant, it is not always possible to stably fix the blank because the seats of the work plate may not correspond to the threaded or non-threaded holes of the blank with which to associate the fixing element.

DISCLOSURE OF THE INVENTION

The aim of the present invention is to solve the above mentioned problems, eliminating the drawbacks in the cited background art, by providing a modular structure, particularly for supporting blanks, which makes it possible to position the pieces and stably lock them in place on the platform of any machine tool, in order to achieve the desired processing.

Within this aim, an object of the invention is to devise a supporting structure that makes it possible to simultaneously work on the greatest possible number of surfaces of the piece, by operating on at least five distinct axes that are perpendicular to each other.

This contrivance is aimed at achieving a reduction, even drastic, in the number of operations to reposition and re-lock in place that is necessary in order to complete the intended processing operations.

Another object of the invention is to obtain a supporting structure which is capable of ensuring an optimal precision of centering of the blank, and which thus also allows the repeatability of this same centering operation in the event of further work carried out later.

Another object of the invention is to devise a supporting structure which allows a utilisation that is quite secure and easy even by labour that does not have special qualifications.

Another object of the invention consists in obtaining a supporting structure that has a substantially flexible employment, and which can be easily adapted even to pieces of weights, dimensions and shapes that are noticeably different.

Another object of the invention is to obtain a supporting structure which makes it possible to rapidly carry out the preliminary operations to lock the piece in place, in order to reduce production costs.

Another object of the invention is to obtain a supporting structure which combines the above mentioned characteristics with that of having low implementation costs, said structure being implementable with the usual and known machines and systems.

This aim and these objects and others which will become better apparent hereinafter are achieved by a modular structure, particularly for supporting blanks, which comprises at least one flat work plate which has a plurality of seats which can be integrally and removably associated with at least one portion of a blank to be worked on by way of fixing means, said fixing means comprising at least one fixing element which can be interposed between said plate and said blank and having at least one upper portion which can be faced towards at least one among said plate and said blank and which is provided with at least one first pin which can be associated, respectively, with one of said seats or with said portion, and can be inserted along its axis in a first cavity defined by said upper portion through a first circular hole defined on the surface of said upper portion which can be faced in the direction, respectively, of said plate or of said blank for the radial locking in place of said first pin relative to said upper portion, said first cavity accommodating a pair of first jaws which can be engaged with said first pin for its axial locking in place relative to said upper portion, characterised in that said fixing element has at least one lower portion which can be faced towards the other among said plate and said blank and which is provided with at least one second pin which can be engaged, respectively, with one of said seats or with said portion, and can be inserted along its axis in a second cavity defined by said lower portion through a second hole with a shape that is substantially elongated along a predefined direction and is substantially perpendicular with respect to said axis of said second pin, said second hole being defined on the surface of said lower portion which can be faced in the direction, respectively, of said plate or of said blank for the locking in place of said second pin relative to said lower portion along a radial direction of said second pin and substantially perpendicular to said predefined direction, said second cavity accommodating a pair of second jaws which can be engaged with said second pin for its axial locking in place relative to said lower portion and which are movable in said second cavity along a direction which is substantially parallel to said predefined direction.

BRIEF DESCRIPTION OF THE DRAWINGS

Further characteristics and advantages of the invention will become better apparent from the detailed description of a particular embodiment thereof, illustrated by way of non-limiting example in the accompanying drawings, wherein.

WAYS OF CARRYING OUT THE INVENTION

Figure 1:
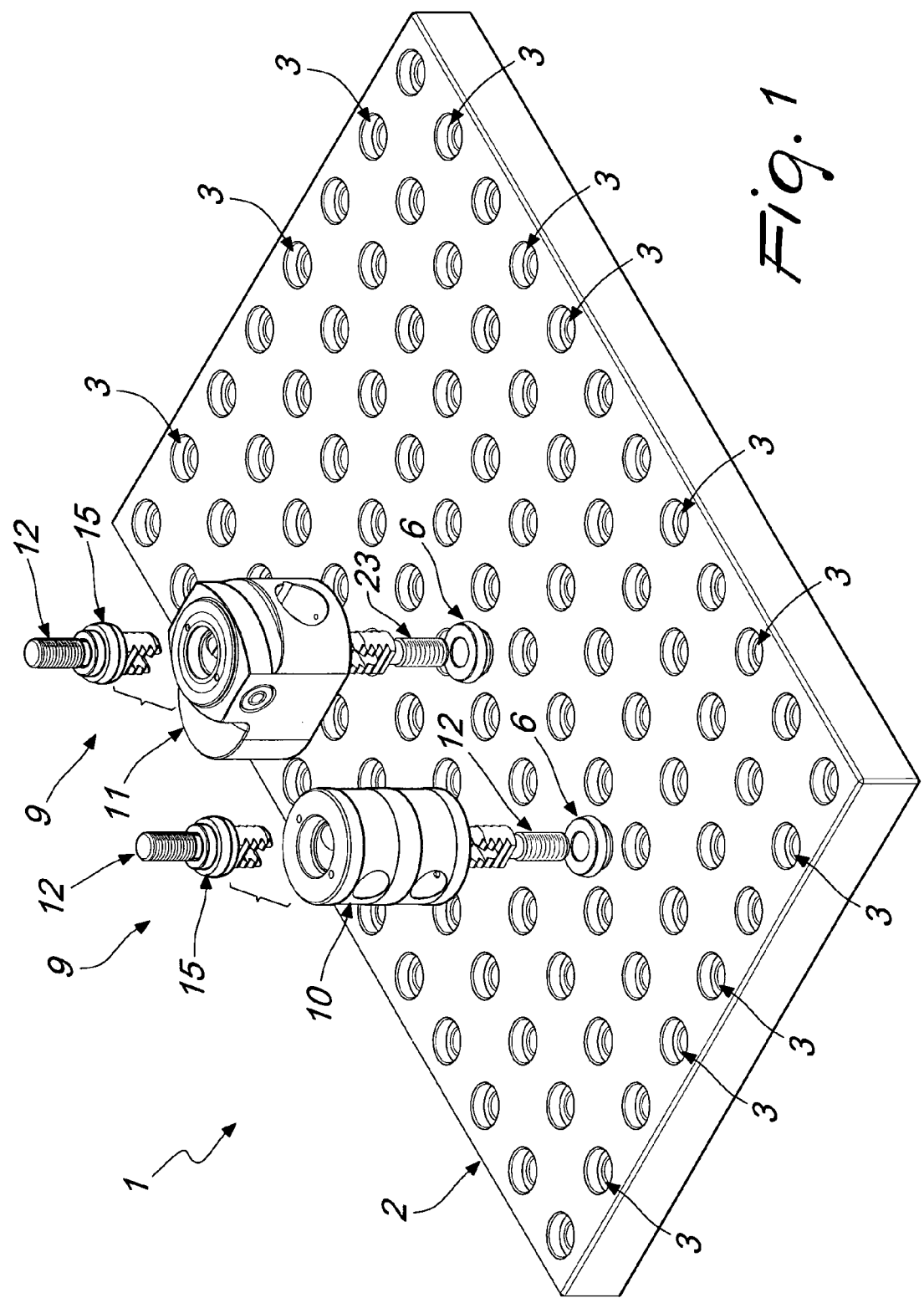
FIG. 1 is a perspective view of a modular structure, particularly for supporting blanks, according to the present invention.
Figure 2:
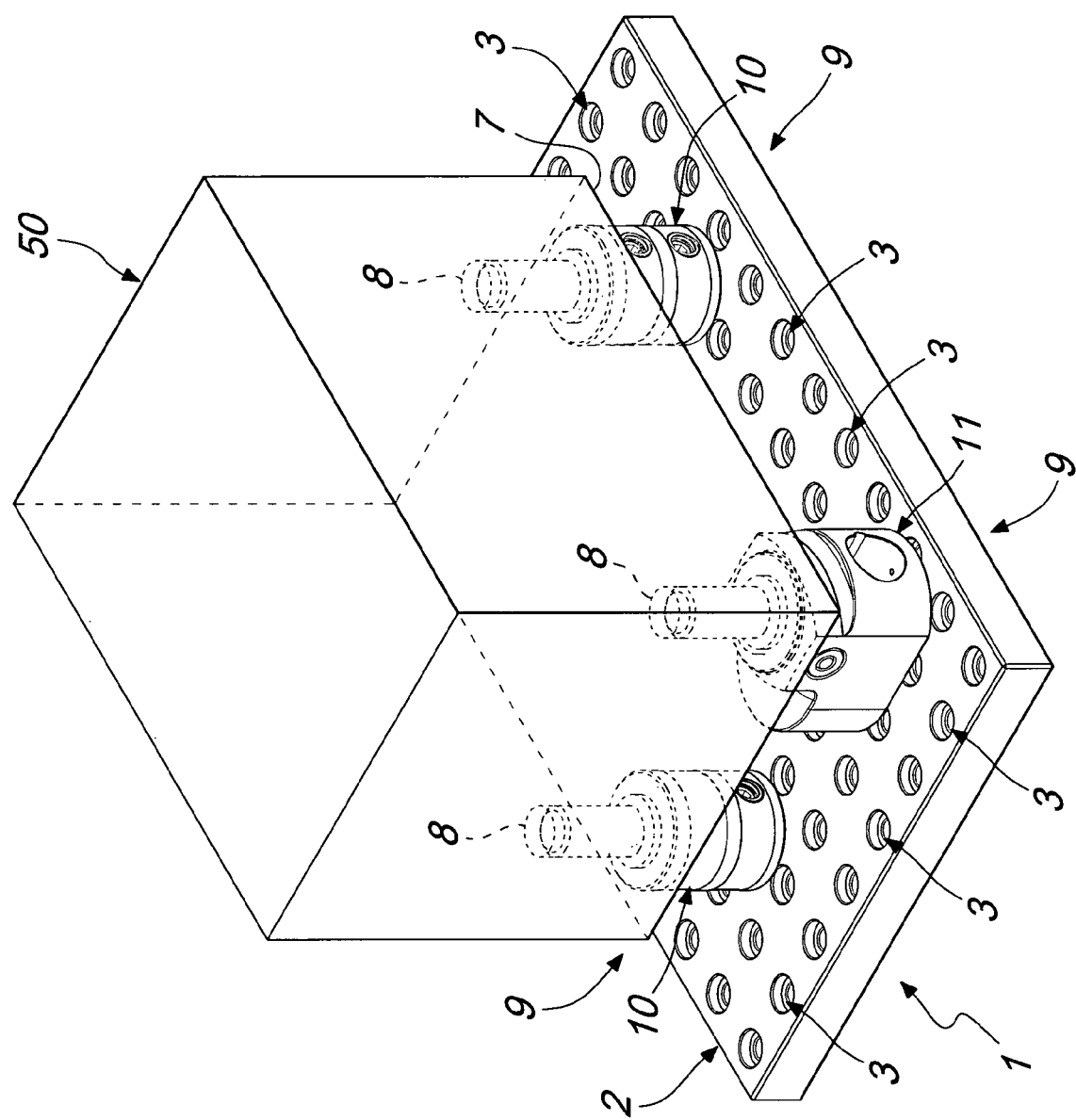
FIG. 2 is a perspective view of the modular structure shown in FIG. 1 with a blank applied to it.

With reference to the figures, a modular structure, generally designated by the reference numeral 1, is particularly adapted to achieve the supporting of a blank, indicated in the figures with the reference numeral 50, or more generally of any piece to be worked on and/or assembled.

The modular structure 1 comprises at least one plate 2, which is substantially flat and which can be associated underneath, by way of interconnection means of known type, with a work bench, which is not shown.

For example, such work bench can be for example the bench of a machine tool or it can be the work bench of another machine for the processing, assembly or painting of blanks.

The plate 2, which forms a shape that is preferably rectangular in plan, has on its upper surface a net of seats 3, advantageously arranged according to a modular net configuration or rectangular mesh configuration.

Each of the seats 3 comprises a compartment 4, below which a dead hole 5 is coaxially obtained, such hole being internally threaded and having a diameter which is advantageously smaller than that of the compartment 4.

The compartment 4 is adapted to act as the stable accommodation of a first portion 6a of a first centering bush, designated in the figures by the reference numeral 6, advantageously shaped like a circular ring.

The first bush 6 has a second upper portion 6b, which has an outer perimetric surface that is substantially frustoconical in shape. This portion 6b protrudes above from the plate 2 once the interconnection between the seat 3 and the first bush 6 has been effected.

In more detail, the seats 3 of the plate 2 can be integrally and removably associated with at least one portion 7, provided with threaded holes 8, of the blank 50 to be worked on by way of fixing means 9.

The fixing means 9 comprise fixing elements 10 and 11 which can be interposed between the plate 2 and the blank 50 and which each have at least one upper part 10a or 11a which can be faced towards at least one among the plate 2 and the blank 50 and at least one lower portion 10b or 11b which can be faced towards the other among the plate 2 and the blank 50.

With reference to the figures, each upper portion 10a or 11a is faced towards the blank 50 and the lower portion 10b or 11b is faced towards the plate 2.

Hereinafter therefore the fixing elements 10 and 11 shall be considered as being oriented as shown. An inverted use thereof with respect to what is shown is however still considered as coming under the scope of the appended claims.

Advantageously, each upper part 10a and 11a of each fixing element 10 and 11 is provided with at least one first pin 12 which can be associated, respectively, with one of the seats 3 or with the portion 7 of the blank 50.

More specifically, the first pin 12 can be inserted along its axis 12a into a first cavity 13 which is defined by the upper portion 10a or 11a through a first circular hole 14 defined on the surface of the upper portion 10a or 11a which can be faced in the direction of the plate 2 for the radial locking in place of the first pin 12 relative to the upper portion 10a or 11a.

Advantageously, there is a second centering bush 15 which is accommodated in the first hole 14 and in which the first pin 12 can be inserted.

Moreover, in the first cavity 13 there is a pair of first jaws 16 which can be engaged with the first pin 12 for its axial locking in place relative to the upper portion 10a or 11a and which comprises two first cylinders 17 which can be locked in place by means of grub screws 52 and which can be made to mutually approach each other by means of a first screw 18 which is inserted in a first through hole 19 which is defined by one of the first cylinders 17 and which can be screwed into a first threaded hole 20 which is defined by the other of the first cylinders 17.

More precisely, the first cavity 13 has a substantially cylindrical shape with a circular base, and the first cylinders 17 of the first jaws 16 also have a substantially cylindrical shape with a circular base.

Therefore by screwing and/or unscrewing the first screw 18 the two first cylinders 17 mutually move. In order to make this possible, the first pin 12 comprises a first end portion 12b which is substantially U-shaped so as to define a first passage 21 of the first screw 18.

In order to prevent unexpected withdrawal of the first pin 12 from the grip of the first jaws 16, on the faces of the first pin 12 and of the first jaws 16 which can be mutually engaged with each other, first grip surfaces 22 are provided which consist for example of toothed profiles.

Moreover, the first pin 12 comprises a second threaded end portion 12c which can be engaged with the threaded holes 8 of the portion 7 of the blank 50.

Figure 3:
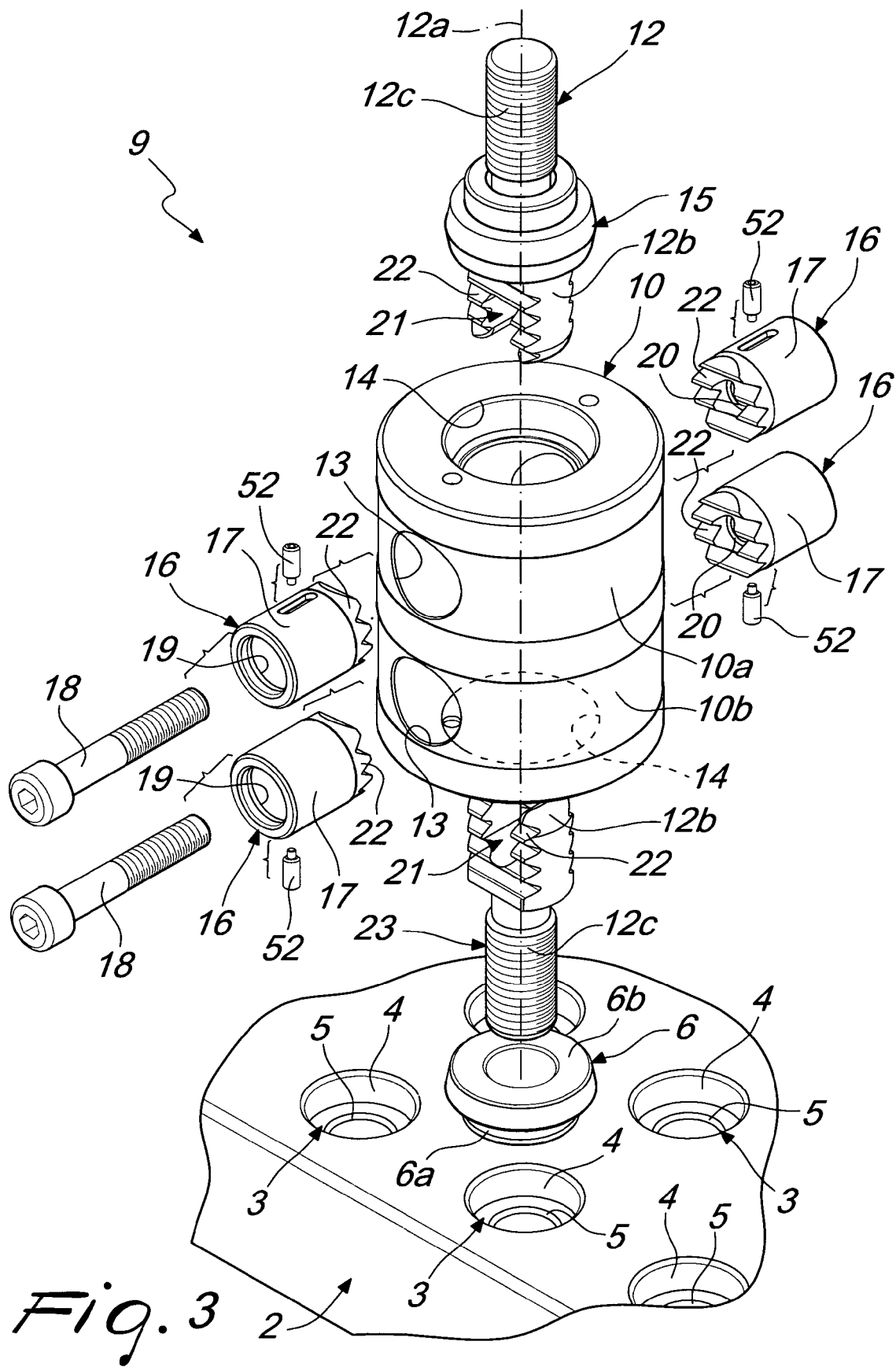
FIG. 3 is an enlarged exploded perspective view of the fixing element according to the invention of the modular structure shown in FIG. 1.

With regard only to the fixing elements 10, which are shown in detail in FIG. 3, the lower portion 10b is entirely similar to the upper portion 10a. Indeed the lower portion 10b has the same elements as the upper portion 10a, which for the sake of brevity will not be described, and will be indicated with the same reference numerals as those used to describe the elements of the upper portion 10a.

More precisely, the upper portion 10a and the lower portion 10b are mirror-symmetrical with each other with the two respective first pins 12 being coaxial between them.

Figure 4:
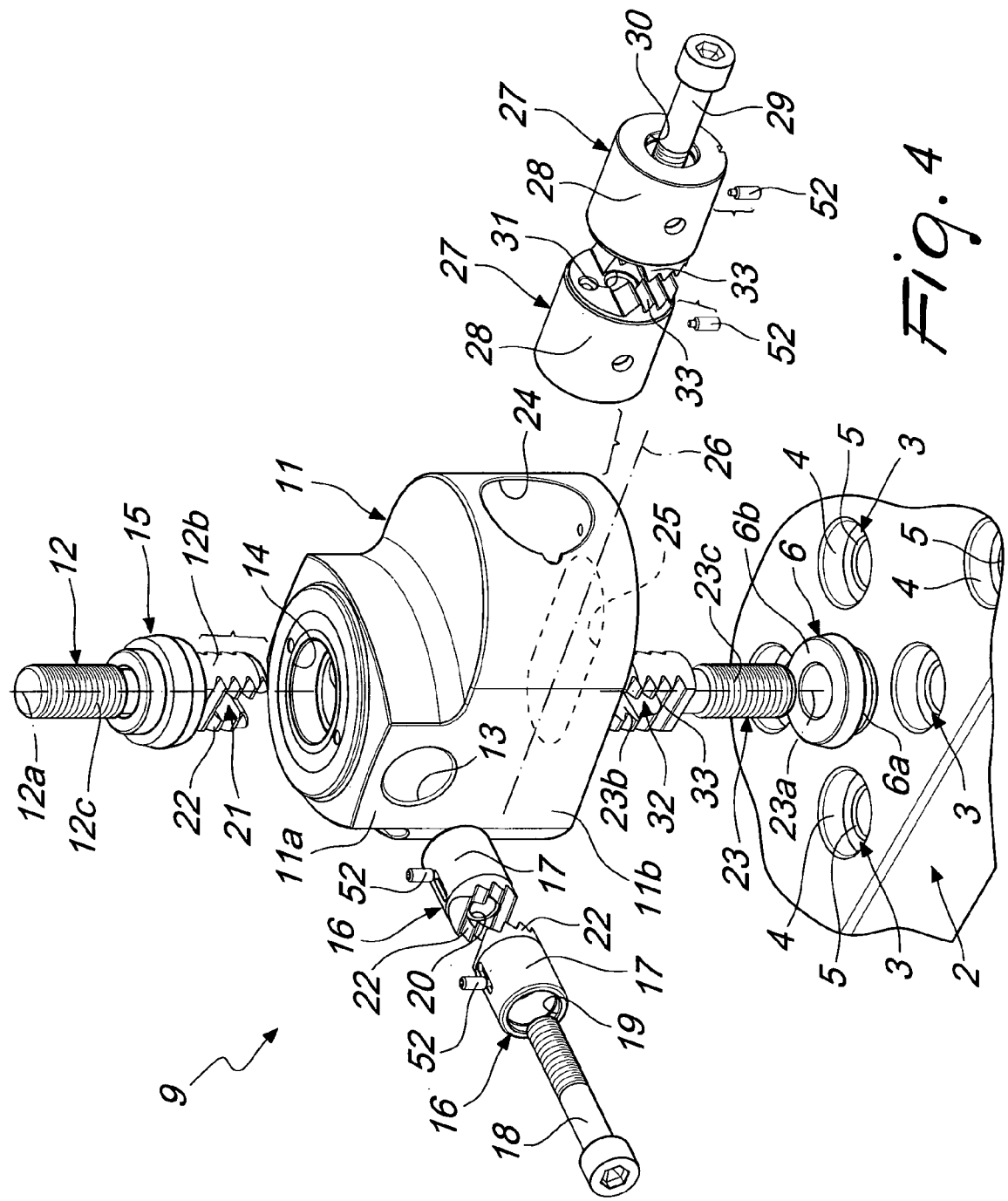
FIG. 4 is an enlarged exploded perspective view of a fixing element of the known type of the modular structure shown in FIG. 1.

Differently, the fixing element 11 shown in detail in FIG. 4, according to the invention, has at least a lower portion 11b which can be faced towards the plate 2 and which is provided with at least one second pin 23 which can be engaged with one of the seats 3.

In more detail, the second pin 23 can be inserted along its axis 23a into a second cavity 24 which is defined by the lower portion 11b through a second hole 25 with a substantially elongated shape along a predefined direction 26 which is substantially perpendicular with respect to the axis 23a of the second pin 23.

Advantageously, the second hole 25 has a shape that is substantially ovoid with two opposing sides that are rectilinear and parallel with respect to the predefined direction 26 and it is defined on the surface of the lower portion 11b which can be faced in the direction of the plate 2 in order to lock in place the second pin 23 relative to the lower portion 11b along a direction that is radial with respect to the second pin 23 and which is substantially perpendicular to the predefined direction 26.

Moreover, the second cavity 24, which also has a shape that is substantially cylindrical with a circular base which runs in the lower portion 11b according to a direction that is substantially parallel to the predefined direction 26 and which is substantially perpendicular with respect to the lengthwise direction of the first cavity 13, accommodates a pair of second jaws 27 which can be engaged with the second pin 23 for its axial locking in place relative to the lower portion 11b and which are movable in the second cavity 24 along a direction that is substantially parallel to the predefined direction 26.

As is the case for the first jaws 16, the second jaws 27 comprise two second cylinders 28 which also have a shape that is substantially cylindrical with a circular base, which can be locked in place by means of grub screws 52 and which can be made to mutually approach each other by means of a second screw 29 which is inserted in a second through hole 30 which is defined by one of the second cylinders 28 and which can be screwed into a second threaded hole 31 which is defined by the other of the second cylinders 28.

Therefore by screwing and/or unscrewing the second screw 29 the two second cylinders 28 mutually move. In order to make this possible, the second pin 23 also comprises a third end portion 23b which is substantially U-shaped so as to form a second passage 32 of the second screw 29.

In order to prevent unexpected withdrawal of the second pin 23 from the grip of the second jaws 27, on the faces of the second pin 23 and of the second jaws 27 which can be mutually engaged with each other, second grip surfaces 33 are provided which consist for example of toothed profiles.

Moreover, the second pin 23 comprises a fourth threaded end portion 23c which can be engaged in one of the seats 3 of the plate 2 which are also threaded.

The application of the modular structure 1 according to the invention is described as follows.

According to whether the threaded holes 8 of the portion 7 of the blank 50 are in line with the seats 3 the fixing elements 10 and/or 11 will be employed.

For example, for the threaded holes 8 which are in line with the seats 3, i.e. which are coaxial with such seats, fixing elements 10 can be employed like the one shown in FIG. 3.

In more detail, the first pins 12 are screwed into the respective threaded holes 8 and into the respective seats 3 with the first end portions 12b coupled by means of the first jaws 16 in the respective upper portions 10a and lower portions 10b.

For the threaded holes 8 which are not in line with the seats 3, i.e. which are not coaxial with such seats, fixing elements 11 can be employed like the one shown in FIG. 4.

In more detail, the first pins 12 and the second pins 23 are screwed, respectively, into the respective threaded holes 8 and into the respective seats 3 with the first end portions 12b and the third end portions 23b coupled by means, respectively, of the first jaws 16 and of the second jaws 27 in the respective upper portions 11a and lower portions 11b.

Advantageously, the eccentricity between the generic threaded hole 8 and the respective seat 3 is recovered thanks to the mobility conceded to the second pin 23 along the predefined direction 26.

Figure 5:
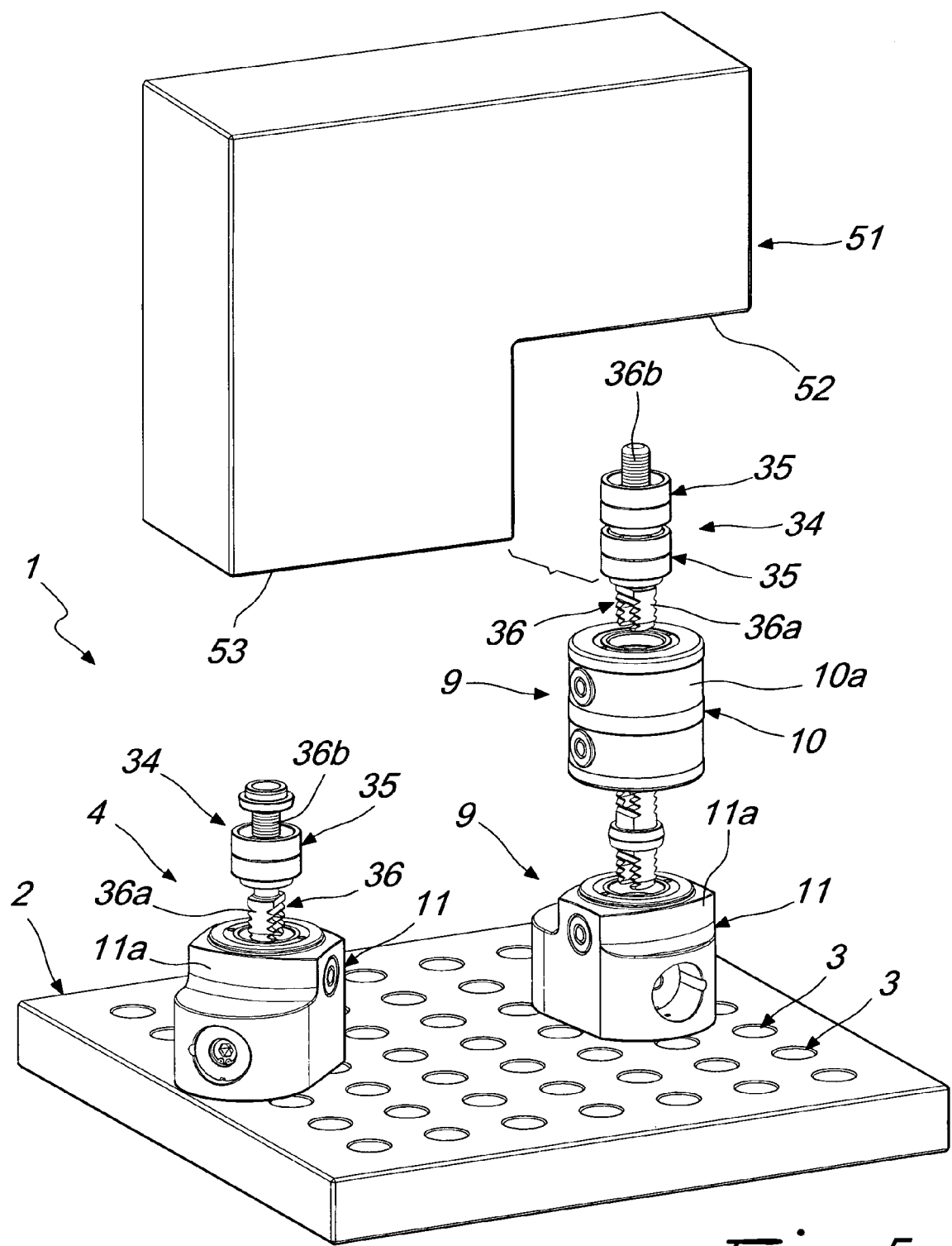
FIG. 5 is a perspective view of the modular structure shown in FIG. 1 with a blank applied to it which is different in shape from the blank shown in FIG. 2.

With reference to FIG. 5, if a blank 51 is to be locked in place by applying the fixing means 9 to multiple portions 52 and 53 which are staggered with respect to each other and which can therefore be located at different distances from the plate 2, spacer means 34 are provided which are constituted by one or more spacer elements 35 which can be fitted over a third pin 36 in place of the first pin 12.

In more detail, the third pin 36 has a length which is adapted to connect the portion 52 or 53 of the blank 51 with the fixing element 10 or 11 and it comprises a first end portion 36a which is substantially U-shaped and which can be engaged with the upper portion 10a or 11a, and a second end portion 36b, formed for example by a threaded shank, which can be engaged with the portion 52 or 53 of the blank 51.

The spacer elements 35, which consist for example of perforated disks, are then fitted over the third pin 36 in such number as to form a stack and remain interposed and resting between the upper portion 10a or 11a of the fixing element 10 or 11 and the portion 52 or 53 of the blank 51.

In this way, a modular connection is implemented between each portion 52 or 53 of the blank 51 and the plate 2 while maintaining them at a predetermined distance from each other.

It has thus been observed that the invention has achieved the intended aim and objects, a modular structure for supporting blanks having been devised which makes it possible to position them and stably lock them in place in order to perform a pre-established process and/or operation, while at the same time ensuring the achievement of an optimal centering thereof, even by operators who are not experienced. This is possible even with blanks which are geometrically complex, the alignment of which is guaranteed by the non-adjustable fixing elements and the stability of which is guaranteed by the adjustable fixing elements.

It has similarly been observed that such locking in place is effected by occupying, for the most part partially and within reduced localised portions, one surface only of the blank, therefore allowing the simultaneous working on and/or treatment of all the other surfaces.

This makes it possible to prevent, or at least to drastically reduce, inconvenient successive changes in positioning of the blank and its associated locking in place, such as for example when dealing with multiple repeated operations performed on the same blank, thus avoiding the development of sources of errors and great expenditure of time.

Obviously the invention is susceptible of numerous modifications and variations, as defined in the appended claims.

Obviously the materials used, as well as the dimensions constituting the individual components of the invention, may be more relevant according to specific requirements.

The invention claimed is:

1. A modular structure, particularly for supporting blanks, which comprises at least one flat plate which has a plurality of seats which can be integrally and removably associated with at least one portion of a blank to be worked on by way of fixing means, said fixing means comprising at least one fixing element which can be interposed between said plate and said blank and having at least one upper portion which can be faced towards at least one among said plate and said blank and which is provided with at least one first pin which can be associated with either one of said seats or with said upper portion, and can be inserted along an axis of said first pin in a first cavity defined by said upper portion through a first circular hole defined on the surface of said upper portion which can be faced in the direction of either said plate or of said blank for the radial locking in place of said first pin relative to said upper portion, said first cavity accommodating a pair of first jaws which can be engaged with said first pin for an axial locking of said first pin in place relative to said upper portion, wherein said fixing element has at least one lower portion which can be faced towards the other among said plate and said blank and which is provided with at least one second pin which can be engaged with either one of said seats or with said lower portion, and can be inserted along an axis of said second pin in a second cavity defined by said lower portion through a second hole with a substantially elongated shape along a predefined direction which is substantially perpendicular with respect to said axis of said second pin, said second hole being defined on the surface of said lower portion which can be faced in the direction of either said plate or of said blank for the locking in place of said second pin relative to said lower portion along a radial direction of said second pin and which is substantially perpendicular to said predefined direction, said second cavity accommodating a pair of second jaws which can be engaged with said second pin for its axial locking in place relative to said lower portion and which are movable in said second cavity along a direction which is substantially parallel to said predefined direction.

2. The modular structure according to claim 1, wherein said second hole has a shape that is substantially ovoid with two opposing sides that are rectilinear and parallel to the predefined direction.

3. The modular structure according to claim 1, further comprising at least one first centering bush which can be accommodated in compartments defined by said seats, said second pin being insertable in said first centering bush.

4. The modular structure according to claim 3, further comprising a second centering bush which is accommodated in said first hole and in which said first pin can be inserted.

5. The modular structure according to claim 1, wherein said first jaws comprise two first cylinders which can be made to mutually approach each other by means of a first screw which is inserted in a first through hole which is defined by one of said first cylinders and which can be screwed into a first threaded hole which is defined by the other of said first cylinders, said first pin comprising a first end portion which is substantially U-shaped so as to define a first passage of said first screw.

6. The modular structure according to claim 5, wherein said first pin comprises a second threaded end portion which can be engaged with said portion of said blank.

7. The modular structure according to claim 5, wherein said first cavity has a substantially cylindrical shape with a circular base and in that said first cylinders of said first jaws also have a substantially cylindrical shape with a circular base.

8. The modular structure according to claim 1, further comprising spacer means which are constituted by one or more spacer elements which can be fitted over a third pin which has a length which is adapted to connect said portion of said blank with said fixing element and has a first end portion which is substantially U-shaped and which can be engaged with said upper portion and a second end portion which can be engaged with said portion of said blank for maintaining said portion at a predetermined distance from said plate.

9. The modular structure according to claim 1, further comprising first grip surfaces which are formed on the faces of said first pin and of said first jaws which can be mutually engaged with each other.

10. The modular structure according to claim 1, wherein said second jaws comprise two second cylinders which can be made to mutually approach each other by means of a second screw which is inserted in a second through hole which is defined by one of said second cylinders and which can be screwed into a second threaded hole which is defined by the other of said second cylinders, said second pin comprising a third end portion which is substantially U-shaped so as to form a second passage of said second screw.

11. The modular structure according to claim 10, wherein said second pin comprises a fourth threaded end portion which can be engaged in one of said seats of said plate.

12. The modular structure according to claim 10, wherein said second cavity has a substantially cylindrical shape with a circular base and in that said second cylinders of said second jaws also have a substantially cylindrical shape with a circular base.

13. The modular structure according to claim 1, further comprising second grip surfaces which are defined on the faces of said second pin and of said second jaws and which can be mutually engaged with each other.

14. The modular structure according to claim 1, wherein said second cavity runs in said lower portion according to a direction that is substantially parallel to said predefined direction.

15. The modular structure according to claim 1, wherein said first cavity runs in said upper portion according to a direction that is substantially perpendicular to said predefined direction.

* * * * *